(12) United States Patent
Kogure et al.

(10) Patent No.: US 7,413,116 B2
(45) Date of Patent: Aug. 19, 2008

(54) BANKING SYSTEM, AUTOMATED TELLER MACHINE, FINANCIAL TRANSACTION METHOD, AND A RECORDING MEDIUM RECORDING A FINANCIAL TRANSACTION PROGRAM READABLE BY COMPUTER

(75) Inventors: Kenji Kogure, Maebashi (JP); Kazuhiro Ootani, Maebashi (JP); Manabu Ookawa, Maebashi (JP)

(73) Assignee: Fujitsu Limited, Kawasaki (JP)

( * ) Notice: Subject to any disclaimer, the term of this patent is extended or adjusted under 35 U.S.C. 154(b) by 376 days.

(21) Appl. No.: 10/972,778

(22) Filed: Oct. 26, 2004

(65) Prior Publication Data

US 2005/0251479 A1 Nov. 10, 2005

(30) Foreign Application Priority Data

May 7, 2004 (JP) ............................. 2004-138763

(51) Int. Cl.
G06K 40/00 (2006.01)
G07D 11/00 (2006.01)
G07F 19/00 (2006.01)
G06F 7/08 (2006.01)
G06Q 40/00 (2006.01)

(52) U.S. Cl. .................. 235/379; 235/381; 705/38; 705/39; 705/43

(58) Field of Classification Search .............. 902/8, 902/9, 12, 13, 14, 15, 37, 39, 40, 41; 705/42, 705/43

See application file for complete search history.

(56) References Cited

U.S. PATENT DOCUMENTS

| 4,734,145 | A  | * | 3/1988  | Monia ................... 156/244.11 |
| 6,796,492 | B1 | * | 9/2004  | Gatto ......................... 235/379 |
| 6,801,604 | B2 | * | 10/2004 | Maes et al. .............. 379/88.17 |
| 7,120,608 | B1 | * | 10/2006 | Gallagher et al. ............. 705/68 |
| 2003/0061162 | A1 | * | 3/2003 | Matthews .................... 705/39 |
| 2006/0015453 | A1 | * | 1/2006 | Kulasooriya et al. ......... 705/39 |

FOREIGN PATENT DOCUMENTS

| CA | 2 298 030 A1 | * | 8/2001 |
| JP | 2002-15139 |   | 1/2002 |

* cited by examiner

*Primary Examiner*—Jared J Fureman
(74) *Attorney, Agent, or Firm*—Westerman, Hattori, Daniels & Adrian, LLP.

(57) ABSTRACT

The present invention is a banking system comprises a borrowing application section, a borrowing information acquiring section that acquires information about the borrowing money permitted by a cashing service dealer, a transaction instruction inputting section that inputs an instruction to carry out a transaction relevant to the financial institution using at least a part of the borrowing money, and a financial transaction instruction section that, when the borrowing information acquiring section acquires the borrowing information, gives an instruction about the transaction relevant to the financial institution using at least a part of the borrowing money to a banking host machine in accordance with the instruction input by the transaction instruction inputting section; thereby, user-friendliness of the machine is increased and the ratio of machine failures is reduced.

12 Claims, 13 Drawing Sheets

FIG. 7

| | |
|---|---|
| | 78 → CANCEL |
| CASHING (ACCOMMODATION) AMOUNT | 100,000YEN |
| CASHING (ACCOMMODATION) BALANCE AFTER TRANSACTION | 40,000YEN |
| | 79 → CONFIRMATION |

19b

BANKING SYSTEM, AUTOMATED TELLER MACHINE, FINANCIAL TRANSACTION METHOD, AND A RECORDING MEDIUM RECORDING A FINANCIAL TRANSACTION PROGRAM READABLE BY COMPUTER

BACKGROUND OF THE INVENTION (1) Field of the Invention

The present invention relates to an automatic teller machine capable of processing of borrowing from cashing service dealer and financial transaction processing using a cash card and a banking system, and further relates to their financial transaction method and a recording medium recording a financial transaction program for executing the method readable by computer.

(2) Description of Related Art

Recently, credit cards issued by cashing service dealers such as credit companies have been widely used. For example, there are increasing such cards that are permitted, using an ATM (Automated Teller Machine) of a financial institution such as a bank, to carry out cashing transaction between a user and a cashing service dealer and financial transaction (for example, money reception, transfer of money) between the user and the financial institution using the above-mentioned credit card.

For example, the following patent document 1 discloses a technique in which, using a compound type card having both functions as a credit card and a cash card, which is issued by a financial institution, withdrawal from a bank account is carried out using an ATM of a credit card company.

[Patent document 1] Japanese Patent Laid-Open Publication No. 2002-15139.

However, in conventional ATMs having the cashing function as described above, the cashing transaction carried out between a user and a cashing service dealer and the financial transaction (for example, money reception, transfer of money) carried out between the user and a financial institution to which the ATM belongs are processed independently from each other.

Accordingly, using such conventional ATM, for example, when transferring money borrowed using a cashing to a particular bank account, the user has to carry out the cashing from the cashing service dealer using the credit card once, and receive the cash from the cash take-out port of the ATM first. And then, the user has to carry out the transfer processing using the cash. Accordingly, there resides such problem that the processing is too complicated for the users.

Further, the cash borrowed using the cashing is always taken out (discharged) once from the ATM. Accordingly, within the ATM, the cash is transferred (moved) frequently increasing the ratio of machine failures.

SUMMARY OF THE INVENTION

The present invention has been achieved in consideration of the above-mentioned problems. An object of the present invention is to provide a banking system to increase the user-friendliness and to reduce the ratio of failures of the machine.

In accordance with the present invention there is provided a banking system which comprises a banking host machine managed by a financial institution, cashing host machine managed by a cashing service dealer, and an automatic teller machine connected to the banking host machine and the cashing host machine so as to respectively communicate therewith, wherein the banking system includes a borrowing application section that makes an application for borrowing money from the cashing service dealer to the cashing host machine, a borrowing information acquiring section that acquires information about the borrowing money, which is permitted by the cashing service dealer with respect to the application for borrowing money made by the borrowing application section, as borrowing information, a transaction instruction inputting section that inputs an instruction to carry out a transaction relevant to the financial institution using at least a part of the borrowing money, and a financial transaction instruction section that, when the borrowing information acquiring section acquires the borrowing information, gives an instruction about the transaction relevant to the financial institution using at least a part of the borrowing money to the banking host machine in accordance with the instruction input by the transaction instruction inputting section.

In accordance with the present invention there is provided the banking system, which further comprises a borrowing money presentation section that presents an amount of borrowing money permitted by the cashing service dealer to the user as the borrowing information may be provided.

In accordance with the present invention there is provided the banking system, which comprises the transaction instruction inputting section may share to carry out the application for borrowing money to the cashing service dealer and the transaction relevant to the financial institution by one-instruction inputting.

In accordance with the present invention there is provided the banking system, which comprises the borrowing money presentation section may share to present at least a part of the amount of the borrowing money permitted by the cashing service dealer to the user of the automatic teller machine as an available amount available for the transaction relevant to the financial institution.

In accordance with the present invention there is provided an automatic teller machine, which comprises a banking host machine managed by a financial institution, cashing host machine managed by a cashing service dealer, and an automatic teller machine connected to the banking host machine and the cashing host machine so as to communicate therewith respectively, wherein the banking system includes a borrowing application section that makes an application for borrowing money from the cashing service dealer to the cashing host machine, a borrowing information acquiring section that acquires information about the borrowing money, which is permitted by the cashing service dealer with respect to the application for borrowing money made by the borrowing application section, as borrowing information, a transaction instruction inputting section that inputs an instruction to carry out a transaction relevant to the financial institution using at least a part of the borrowing money, and a financial transaction instruction section that, when the borrowing information acquiring section acquires the borrowing information, gives an instruction about the transaction relevant to the financial institution using at least a part of the borrowing money to the banking host machine in accordance with the instruction input by the transaction instruction inputting section.

In accordance with the present invention there is provide with the automatic teller machine, which further comprises a borrowing money presentation section that presents an amount of borrowing money permitted by the cashing service dealer to the user as the borrowing information may be provided.

In accordance with the present invention there is provided the automatic teller machine, which comprises the transaction instruction inputting section may be an inputting means capable of sharing to input instruction for carrying out the application for borrowing money to the cashing service dealer and the transaction relevant to the financial institution as a serial processing.

In accordance with the present invention there is provided the automatic telling machine, which comprises the borrowing money presentation section may share to present at least a part of the amount of the borrowing money permitted by the cashing service dealer to the user of the automatic teller machine as an available amount available for the transaction relevant to the financial institution.

In accordance with the present invention there is provided the automatic telling machine, which operates such that when no instruction is given from the transaction instruction inputting section within a predetermined time from a point of time when the borrowing money presentation section presents the available amount of money to the user, the available amount of cash may be invested.

In accordance with the present invention, there is provided a financial transaction method, which comprises a borrowing application step in which an application for borrowing money from a cashing service dealer is made to a cashing host machine managed by the cashing service dealer, a borrowing information acquiring step in which information about the borrowing money permitted by the cashing service dealer with respect to the application for borrowing money made by the borrowing application section is acquired as borrowing information, a transaction instruction inputting step in which an instruction to carry out a transaction relevant to the financial institution using at least a part of the borrowing money is input, and a financial transaction instruction step in which, when the borrowing information acquiring section acquires the borrowing information, an instruction about the transaction relevant to the financial institution using at least a part of the borrowing money to the banking host machine managed by the financial institution is given in accordance with the instruction input by the transaction instruction inputting section.

In accordance with the present invention, there is provided the financial transaction method, which further comprises a borrowing money amount presenting step in which the amount of borrowing money permitted by the cashing service dealer is presented to the user as the borrowing information may be included.

In accordance with the present invention, there is provided the financial transaction method, which comprises the transaction instruction inputting step, in which the application for borrowing money to the cashing service dealer and the transaction relevant to the financial institution may be shared to be carried out by one-instruction inputting.

Further, in accordance with the present invention, there is provided the financial transaction method, which comprises the borrowing money amount presenting step, in which at least a part of the amount of the borrowing money permitted by the cashing service dealer may be shared to be presented to the user of the automatic teller machine as the available amount available for the transaction relevant to the financial institution.

In accordance with the present invention, there is provided a recording medium recording a financial transaction program readable by a computer, wherein the financial transaction program causes the computer to function as a borrowing application section that makes an application for borrowing money from a cashing service dealer to a cashing host machine managed by the cashing service dealer, a borrowing information acquiring section that acquires information about the borrowing money, which is permitted by the cashing service dealer with respect to the application for borrowing money made by the borrowing application section, as borrowing information, a transaction instruction inputting section that inputs an instruction to carry out a transaction relevant to the financial institution using at least a part of the borrowing money, and a financial transaction instruction section that, when the borrowing information acquiring section acquires the borrowing information, gives an instruction about the transaction relevant to the financial institution using at least a part of the borrowing money to a banking host machine managed by the financial institution in accordance with the instruction input by the transaction instruction inputting section.

According to the present invention, such advantages that user-friendliness is increased and the ratio of mechanical failures is reduced can be obtained.

BRIEF DESCRIPTION OF THE DRAWINGS

FIG. 7 is a diagram showing an example of an accommodation amount confirmation screen, which is displayed on the customer-operated touch panel display of the ATM constituting the banking system as one embodiment of the present invention.

DESCRIPTION OF THE PREFERRED EMBODIMENTS

Figure 1:
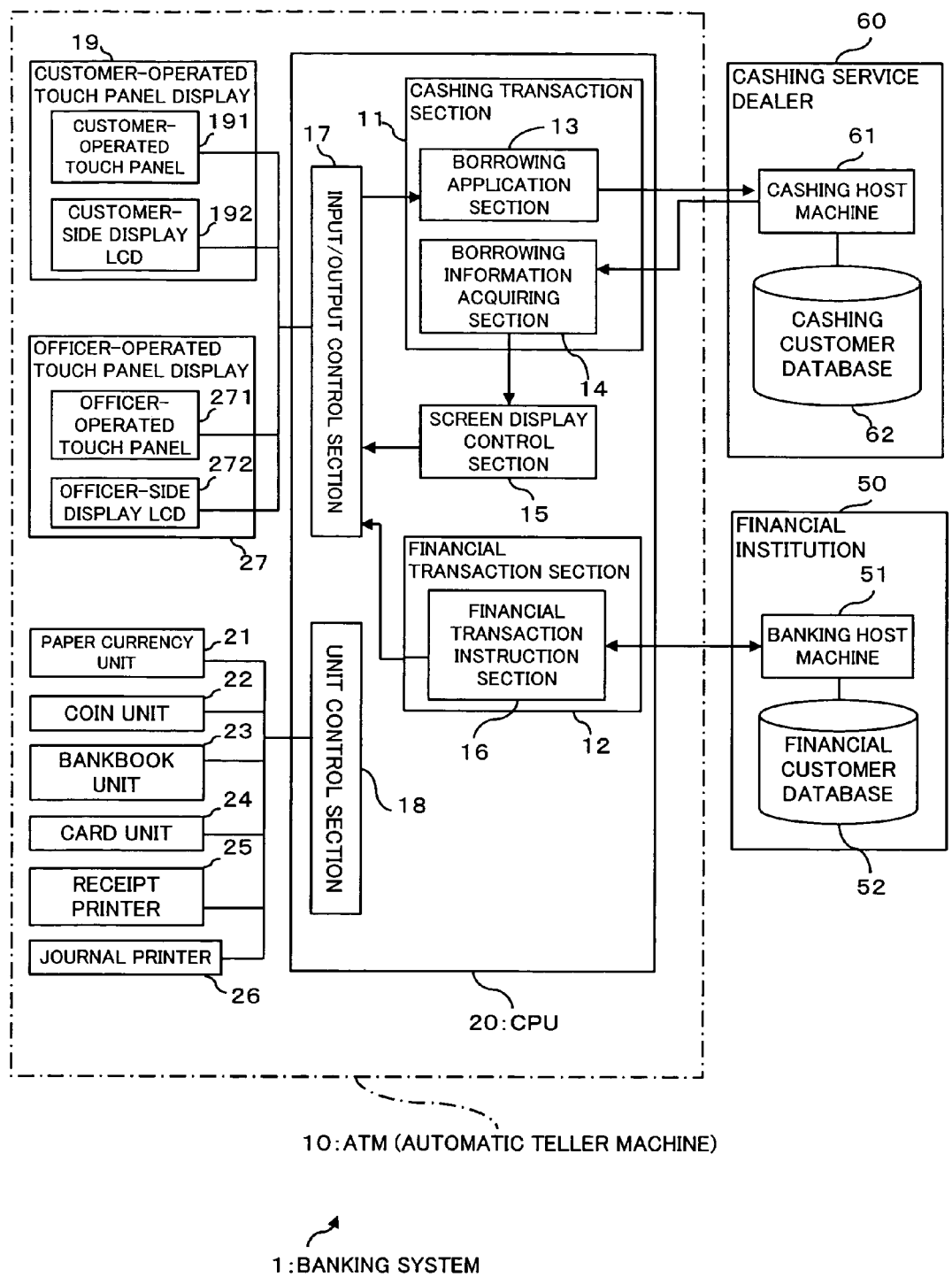
FIG. 1 is a diagram schematically showing the configuration of a banking system as one embodiment of the present invention.

Now, referring to the drawings, embodiments of the present invention will be described.

FIG. 1 is a diagram showing the configuration of a banking system as one embodiment of the present invention. As shown in FIG. 1, the banking system 1 provides financial services, which are provided by financial institution 50, and services (cashing), which are provided by cashing service dealer 60, to users of an ATM (Automated Teller Machine) 10. As shown in FIG. 1, the banking system 1 comprises a banking host machine 51 and a cashing host machine 61 and the ATM 10.

The financial institution 50 is an institution such as a bank, which provide customers financial services (transaction) and manages a banking host machine 51 and a financial customer database 52. Hereinafter, in this embodiment, the description will be made while taking a bank as an example of the financial institution 50. Also the description will be made while taking the following example; i.e., the financial institution 50 provides various financial services to the users (customers) of the ATM 10 such as transfer of money to a particular account, money reception, withdrawal, balance inquiry with respect to the account of the customer.

The financial institution 50 issues a cash card, which is used when the users carry out financial transaction using the ATM 10. Also, the financial institution 50 carries out installation and management of the ATM 10.

The banking host machine 51 is connected to the ATM so as to communicate therebetween via a communication line, and is connected to the financial customer database 52 so as to communicate therebetween. The banking host machine 51 is adopted to manage a variety of information (customer's ledger and the like) with respect to the accounts of the respective users using the financial customer database 52, and to carry out various kinds of processing with respect to the accounts of the users such as money reception, withdrawal, balance inquiry and transfer of money based on the instruction and input through the ATM 10 and the like.

The cashing service dealer 60 accommodates customers, and manages a cashing host machine 61 and a cashing customer database 62. Hereinafter, in this embodiment, the description will be made while taking a credit company as an example of the cashing service dealer 60. The description will be made while taking the following example; i.e., with respect to an application for borrowing money (accommodation) of founds made by a user (customer) of the ATM 10, the cashing service dealer 60 carries out an examination and the like based on the cashing customer database 62, and when the examination result satisfies a predetermined criterion or the like, the cashing service dealer 60 carries out the accommodation and the like to the user.

Also, the cashing service dealer 60 issues a credit card, which is used when the user makes an application for cashing using the ATM 10.

The cashing host machine 61 is connected to the ATM 10 so as to communicate therebetween via a communication line, and connected to the cashing customer database 62 so as to communicate therebetween. The cashing host machine 61 is adopted so as to manage a variety of information (records, credit and the like) with respect to the personal information and accommodation of the customers using the cashing customer database 62, and to carry out various kinds of processing (for example, transmission of accommodation permission message and renewal of accommodation record) for carrying out the accommodation with respect to the application for borrowing money (accommodation request) through the ATM 10 and the like.

For example, when the cashing service dealer 60 receives a borrowing request massage (accommodation request message) with respect to an application for borrowing money from the ATM 10, the cashing host machine 61 refers to customer information (accommodation limit, balance of accommodation and the like) registered in the cashing customer database 62 to determine (examine) whether the application for the accommodation should be permitted or rejected. The cashing service dealer 60 is adopted so as, as a result of the examination, when it is determined the application for the accommodation is permissible, to carry out transmission of accommodation permission message, notification of accommodation amount and the like to the ATM 10.

The ATM 10 is managed and operated by the financial institution 50. For example, the ATM 10 is installed in a shop and the like of the financial institution 50, and is connected to the cashing host machine 61 and the banking host machine 51 so as to respectively communicate therebetween. The ATM 10 provides various services (financial transaction) provided by the financial institution 50 to the users. The ATM 10 carries out application for borrowing money to the cashing service dealer 60 and payment of cash and the like, which is accommodated as a result of the application.

In this embodiment, the users of the ATM 10 are the customers of the financial institution 50 as well as the customers of the cashing service dealer 60. Hereinafter, the wording "user of the ATM 10" means the customer of the financial institution 50 as well as the customer of the cashing service dealer 60.

As shown in FIG. 1, the ATM 10 comprises a computer system (information processing system) including a customer-operated touch panel display 19, an officer-operated touch panel display 27, a paper currency unit 21, a coin unit 22, a bankbook unit 23, a card unit 24, a receipt printer 25, a journal printer 26 and a CPU 20. It is adopted so that the CPU 20 executes a program (financial transaction program) stored in unshown memory or hard disk to cause the system to work.

The customer-operated touch panel display (transaction instruction inputting section) 19 is an inputting and outputting device to be used by the users of the ATM 10, and comprised of a customer-operated touch panel 191 and a customer-side display LCD 192. The customer-side display LCD (Liquid Crystal Display) 192 provides the users of the ATM 10 with a variety of information relevant to the transaction (a variety of information provided by the financial institution 50 and the cashing service dealer 60, such as transaction result, messages, various kinds of keys for transaction, which will be described later). The customer-operated touch panel 191 is provided for the users of the ATM 10 to carry out a variety of operation and inputting (transaction instructions, selection and the like) relevant to the transaction. The customer-operated touch panel 191 is adopted so as to install all over the display screen of the customer-side display LCD 192 being overlapped therewith. The customer-operated touch panel 191 detects the point touched by a finger of a user, and appoints the point on the display screen of the customer-side display LCD 192 to allow the customer to input instruction by means of input keys and the like corresponding to the point.

It is arranged so that the users use the customer-operated touch panel 191 (customer-operated touch panel display 19) to input application for borrowing money to the cashing service dealer 60, or to input instruction to carry out transaction (for example, money reception, transfer of money and the like) relevant to the financial institution 50, and the like.

In particular, the customer-operated touch panel display 19 is adapted so as to display a display screen (refer to FIG. 2) formed with input keys (buttons) for executing various functions. And when a user touches these input keys with a finger or the like to select them, functions corresponding to these keys are executed and thus, various transactions are carried out between the user and the cashing service dealer 60 or the financial institution 50.

The officer-operated touch panel display 27 is an inputting and outputting device used by a manager (officer) of the ATM 10. The officer-operated touch panel display 27 comprises an officer-operated touch panel 271 and an officer-side display LCD 272. The officer-side display LCD 272 presents a variety of information about the transaction to the officer. The officer-operated touch panel 271 is used by the officer to operate and input a variety of information (instruction, selection and the like of the transaction) about the management of the ATM 10. The officer-operated touch panel 271 is installed all over the display screen of the officer-side display LCD 272 being overlapped therewith. And the officer-operated touch panel 271 is adapted so as to detect a point where is touched by a finger of the manager and to appoint a point on the display screen of the officer-side display LCD 272 to allow the manager to input instructions.

Further, the above customer-operated touch panel display 19 and the officer-operated touch panel display 27 are adapted so that an input/output control section 17 (which will be described later) controls the input and output thereof.

The paper currency unit 21 discharges, receives and stores the paper currency. The coin unit 22 discharges, receives and stores the coins. The bankbook unit 23 performs printing on a bankbook. The receipt printer 25 performs printing on a receipt paper (receipt) to be delivered to the users. And the journal printer 26 performs printing on a paper for journal (journal).

The card unit 24 reads out information written using magnetic signals and the like on the card. The card unit 24 is adapted so as to read out information (cash card number, credit card number and the like), which is previously registered in these cards with respect to the both cards; i.e., a cash card issued by the financial institution 50 and a credit card issued by a cashing service dealer 60.

The input/output control section 17 controls the input and output in the customer-operated touch panel display 19 and the officer-operated touch panel display 27. The input/output control section 17 is adapted so as to control the input from the customer-operated touch panel 191 and the officer-operated touch panel 271 and the display (output) to the customer-side display LCD 192 and the officer-side display LCD 272. The unit control section 18 controls the paper currency unit 21, the coin unit 22, the bankbook unit 23, the card unit 24, the receipt printer 25 and the journal printer 26 respectively.

The CPU 20 performs a variety of calculation processing. As shown in FIG. 1, the CPU 20 works as a cashing transaction section 11, a financial transaction section 12, a screen display control section 15, an input/output control section 17 and unit control section 18.

The cashing transaction section 11 enables cashing transaction between the user and the cashing service dealer 60. In this embodiment, it is arranged so that, as the cashing transaction, when a user makes an application for borrowing money to a cashing service dealer, and when an accommodation is carried out from the cashing service dealer 60 to the user, the cash is presented to the user so as to be used by the user.

As shown in FIG. 1, the cashing transaction section 11 comprises a borrowing application section 13 and a borrowing information-acquiring section 14. The borrowing application section 13 enables application for borrowing money from the user to the cashing service dealer 60. The borrowing application section 13 is adapted so as, when a user inputs an instruction to carry out an application for borrowing money using the customer-operated touch panel 191, to transmit a accommodation request massage (accommodation request message) to the cashing host machine 61 along with information (name, number of credit card and the like) about the user.

When the user makes an application for borrowing money using the ATM 10, for example, the user inputs instruction of application for borrowing money through the customer-operated touch panel 191, and insert a credit card issued by the cashing service dealer 60 into the card unit 24. After that, the user inputs personal identification number, amount of money to borrow and the like through the customer-operated touch panel 191.

It is adapted so that, with respect to the application for borrowing money made to the cashing host machine 61 from the borrowing application section 13, when it is determined that the accommodation is permissible by the cashing service dealer 60, the borrowing information acquiring section 14 receives an accommodation permission message transmitted from the cashing host machine 61, and acquires the accommodation amount as borrowing information along with the fact that the accommodation has been permitted. Further, it is adapted so that the borrowing information acquired by the borrowing information-acquiring section 14 is stored in an unshown memory or the like and transferred to the screen display control section 15.

The financial transaction section 12 enables financial transaction between the user and the financial institution 50. In this embodiment, the financial transaction section 12 is adapted to carry out money reception to a savings account (hereinafter, referred to as account) of the user and transfer of money to a particular account to be transferred as the financial transaction.

As shown in FIG. 1, the financial transaction section 12 comprises a financial transaction instruction section 16. The financial transaction instruction section 16 provides instructions (transmission and reception of various messages) about the transaction relevant to the financial institution 50 to the banking host machine 51 in accordance with the instruction to carry out the transaction relevant to the financial institution 50, which is input through the customer-operated touch panel 191. It is adapted so that, for example, when the transaction is money reception, the financial transaction instruction section 16 transmits a money reception request message to the banking host machine 51; and when the transaction is transfer of money; the financial transaction instruction section 16 transmits a transfer request message to the banking host machine 51.

The screen display control section 15 controls a variety of screens displayed on the customer-operated touch panel display 19 and the officer-operated touch panel display 27. The screen display control section 15 is adapted so as to cause the customer-operated touch panel display 19 to display, for example, a transaction selecting screen (refer to FIG. 2) provided with various keys for the customers to input selections and instructions, or an accommodation amount confirmation screen (refer to FIG. 7) for showing accommodation result and the like to the user; and depending on the situation, to cause the customer-operated touch panel display 19 to display various messages and guidance.

Figure 2:
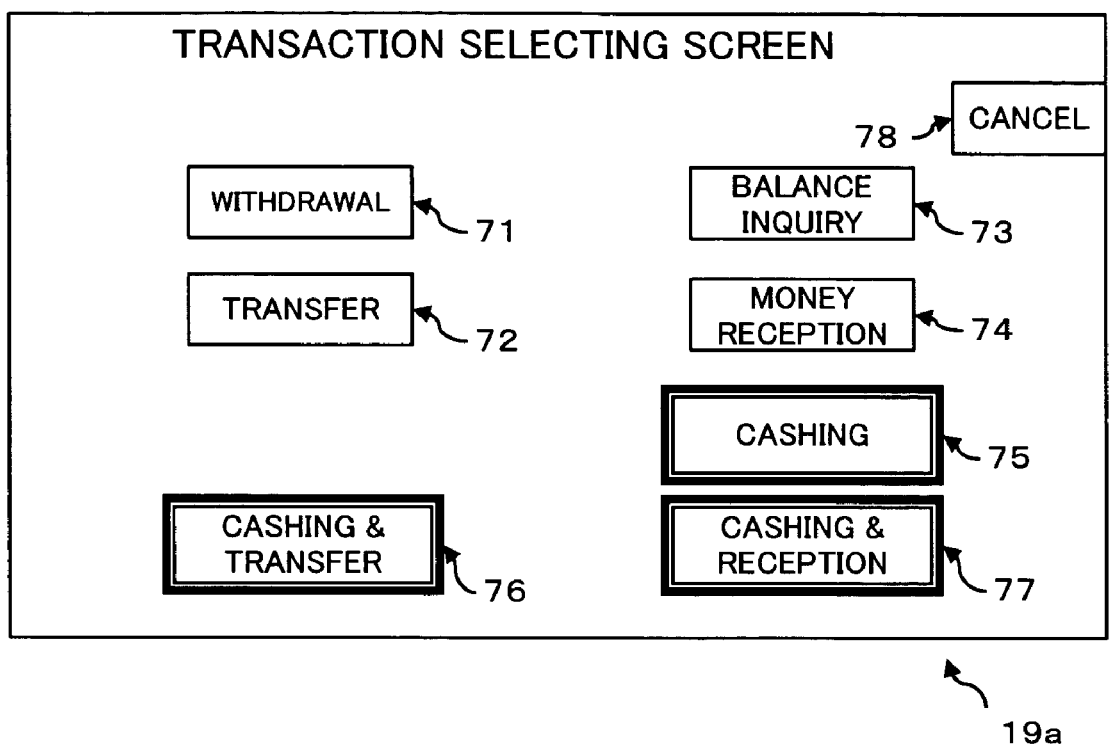
FIG. 2 is a diagram showing an example of a screen (transaction selecting screen), which is displayed on a customer-operated touch panel display of an ATM constituting a banking system as one embodiment of the present invention.
Figure 3:
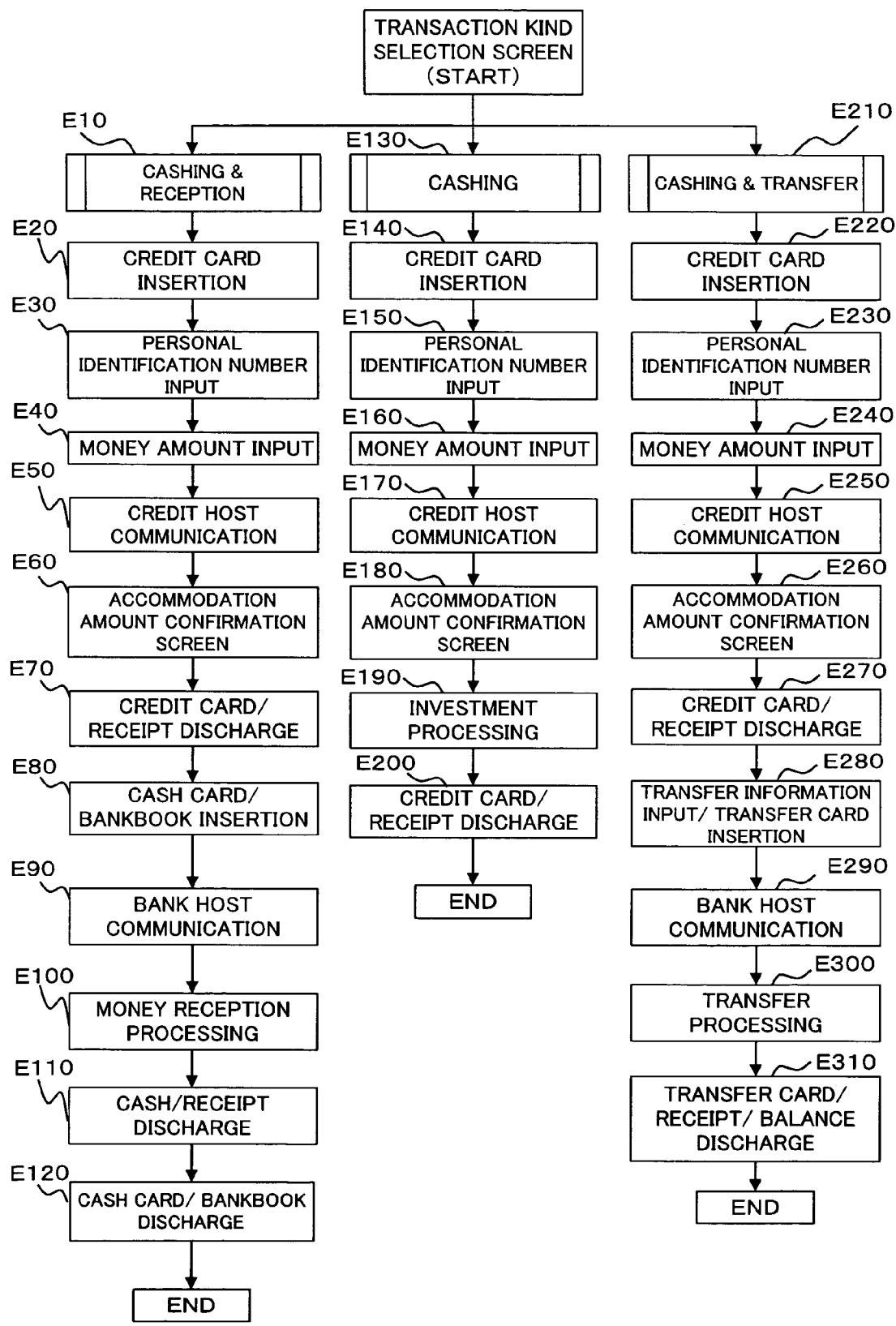
FIG. 3 is a flowchart for illustrating processing based on a selection made on a transaction-selecting screen displayed of the customer-operated touch panel display of the banking system as one embodiment of the present invention.

FIG. 2 is a diagram showing an example of a screen (transaction selecting screen) 19a displayed on the customer-operated touch panel display 19 of the ATM 10 constituting the banking system 1 as one embodiment of the present invention. As shown in FIG. 2, the transaction selecting screen 19a is displayed on the customer-operated touch panel display 19, and the transaction selecting screen 19a is a screen for selecting a transaction (processing) the user of the ATM 10 desires.

In the example shown in FIG. 2, the transaction selecting screen 19a comprises a withdrawal key 71, a transfer key 72, a balance inquiry key 73, a money reception key 74, a cashing key 75, a cashing & transfer key 76, a cashing & reception key 77 and a cancel key 78. The transaction selecting screen 19a is adapted so as, when the user selects a desired key from these keys, to carry out each processing of withdrawal, transfer of money, balance inquiry, money reception, cashing and transfer, cashing & reception and deletion.

The withdrawal key 71 is a key for withdrawing cash from an account of the user in the financial institution 50. The transfer key 72 is a key for transferring money to a particular account using cash or deposit money in the user's account. The balance inquiry key 73 is a key for inquiring deposit balance in the user's account. The money reception key 74 is a key for receiving money in the user's account. That is, the withdrawal key 71, the transfer key 72, the balance inquiry key 73 and the money reception key 74 are the keys for carrying out the transaction between the user and the financial institution 50.

The cashing key 75 is a key for borrowing (cashing) from the cashing service dealer 60; i.e., for carrying out the transaction between the user and the cashing service dealer 60. The cancel key 78 is a key for canceling the selected processing to return to the main menu.

The cashing & transfer key 76 is a key for borrowing money from the cashing service dealer 60 as well as transferring at least a part of the borrowing money to a particular account; i.e., for carrying out the borrowing and transferring of money by one-instruction inputting. Also, the cashing & reception key 77 is a key for borrowing money from the cashing service dealer 60 as well as for receiving at least a part of the borrowing money to the user's account; i.e., for carrying out the borrowing and receiving of money by one-instruction inputting. That is, the above cashing & transfer key 76 and the cashing & reception key 77 are the inputting means (transaction instruction inputting sections) for carrying out transaction (application for borrowing money) between the user and the cashing service dealer 60 and the transaction between the user and the financial institution 50 by one-instruction inputting.

Likewise the above-described cashing & transfer key 76 and the cashing & reception key 77, the screen display control section 15 is adapted so as to cause the customer-operated touch panel display 19 to display and present the keys (transaction instruction inputting section; inputting means), which are capable of inputting the instructions to carry out the transaction between the user and the cashing service dealer 60 and the transaction between the user and the financial institution 50 as a sequential processing, to the user. That is, it is adapted so that the cashing & transfer key 76 and the cashing & reception key 77 in the accommodation amount confirmation screen 19a work as the inputting means, which are capable of inputting the instruction to execute the transaction (application for borrowing money) relevant to the cashing service dealer 60 and the transaction relevant to the financial institution 50 as a sequential processing.

Figure 4:
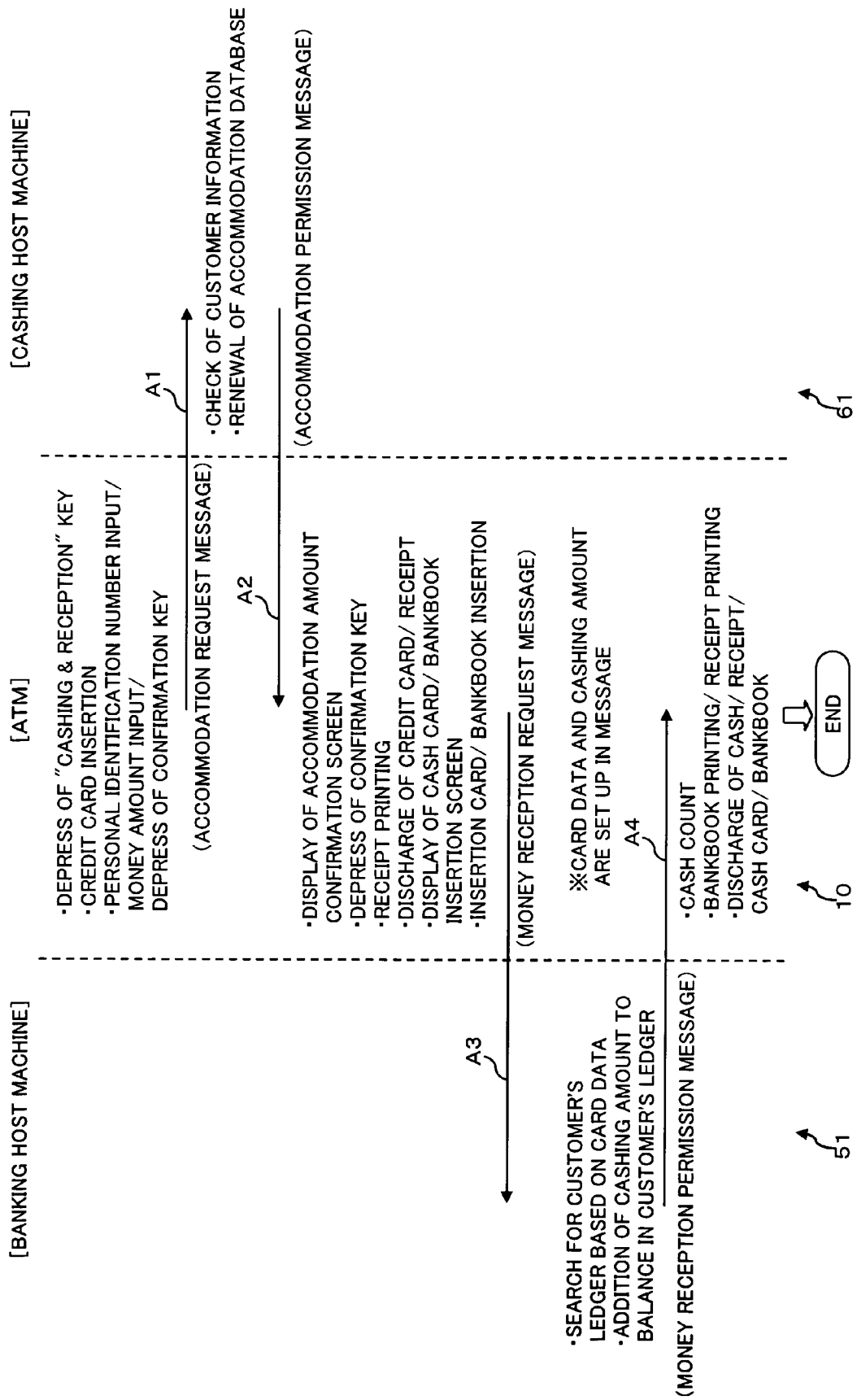
FIG. 4 is a diagram showing a transition of state of transaction message among the ATM, a banking host machine and a cashing host machine in the banking system as one embodiment of the present invention.
Figure 5:
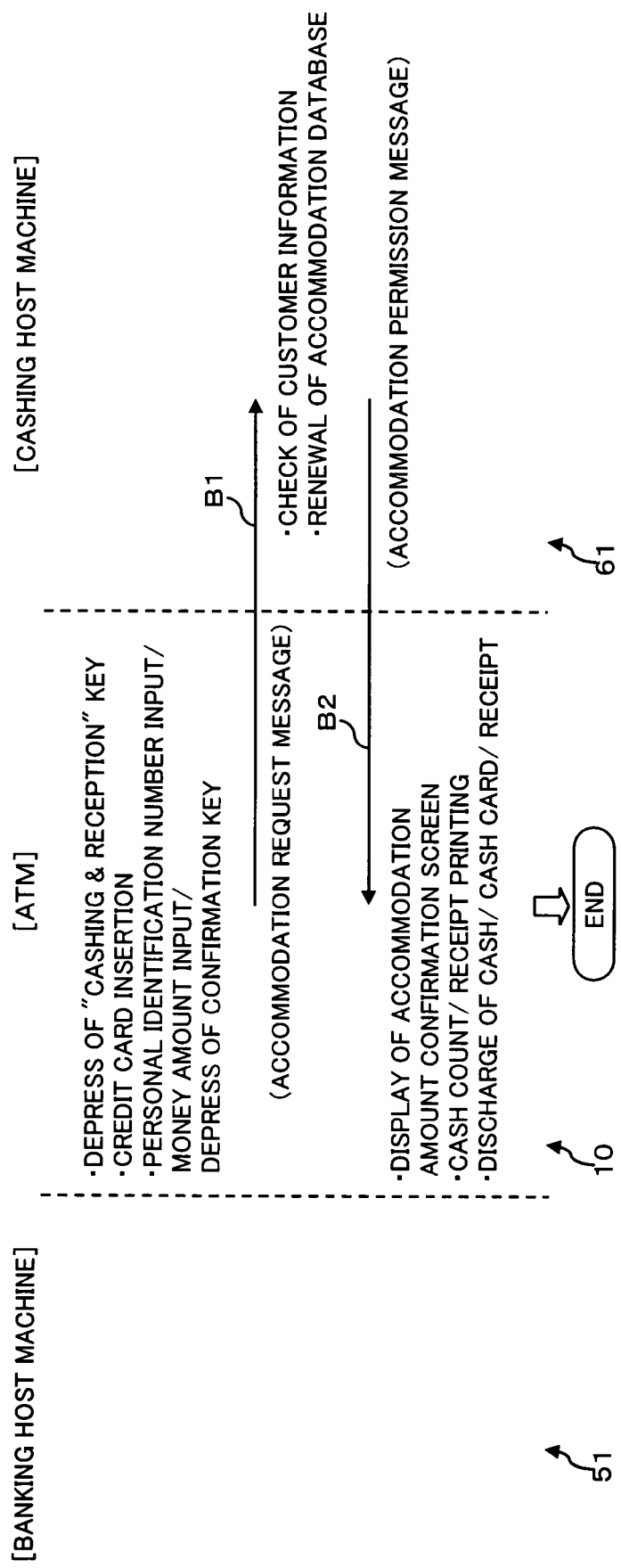
FIG. 5 is a diagram showing a transition of state of transaction message among the ATM, a banking host machine and a cashing host machine in the banking system as one embodiment of the present invention.
Figure 6:
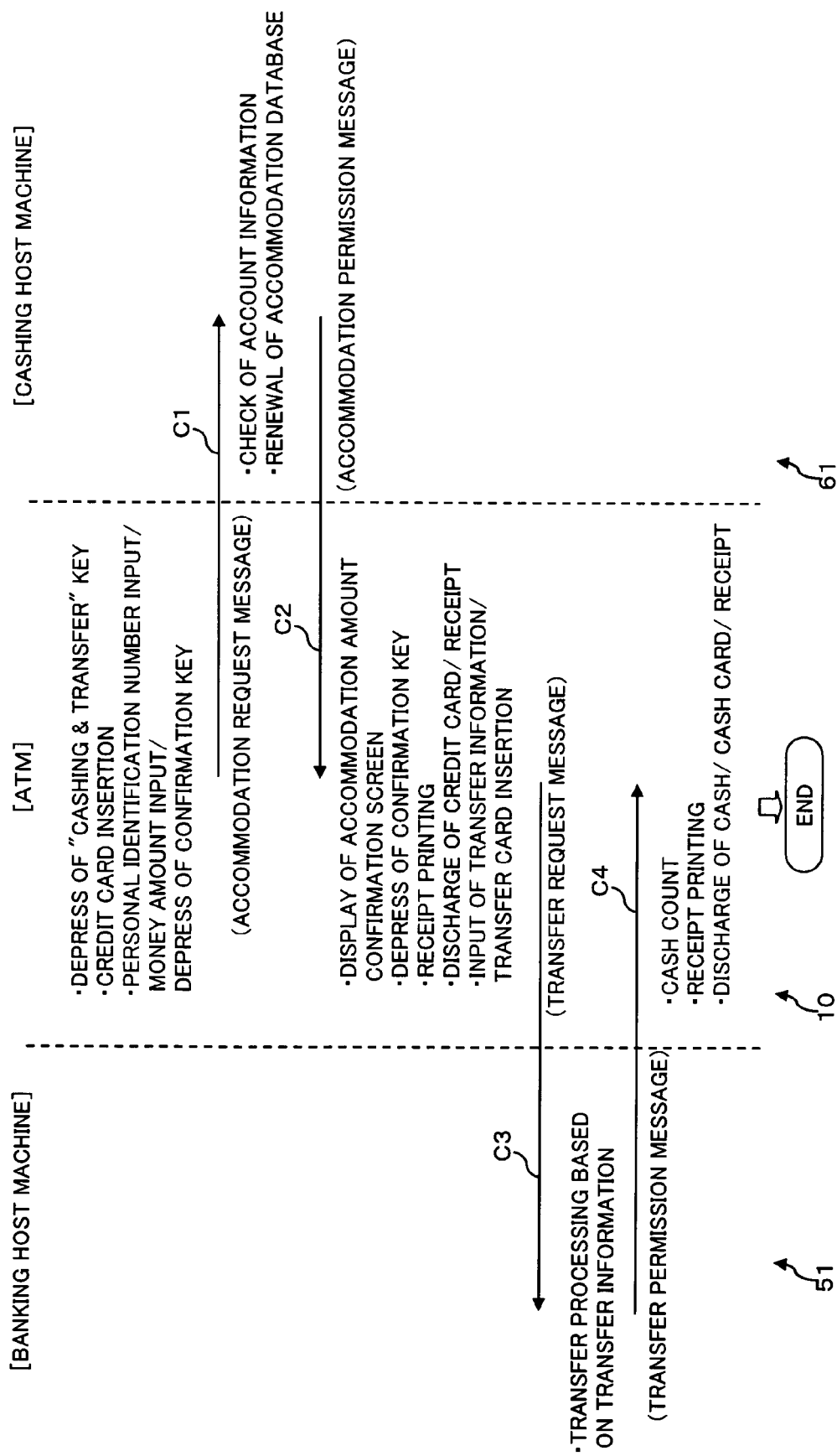
FIG. 6 is a diagram showing a transition of state of transaction message among the ATM, a banking host machine and a cashing host machine in the banking system as one embodiment of the present invention.
Figure 8:
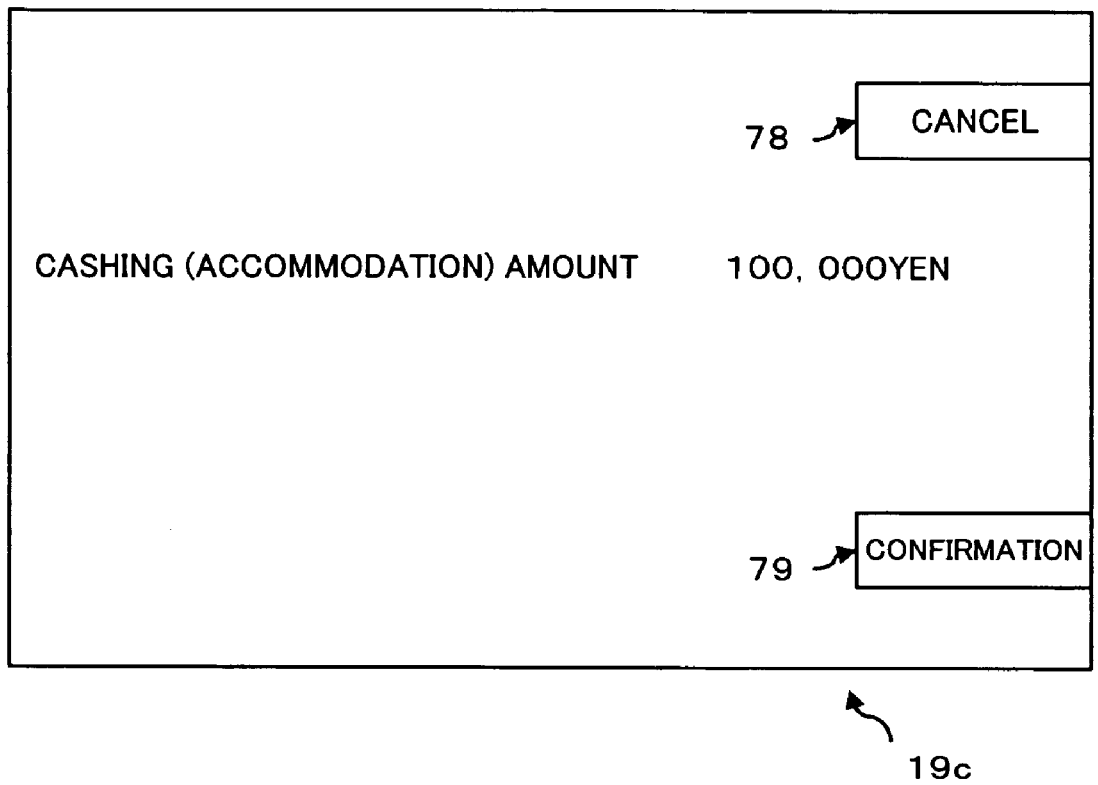
FIG. 8 is a diagram showing an example of an accommodation amount confirmation screen, which is displayed on the customer-operated touch panel display of the ATM constituting the banking system as one embodiment of the present invention.

Referring to FIG. 4-FIG. 8, in the transaction selecting screen 19a displayed on the customer-operated touch panel display 19 in the banking system 1 as one embodiment of the present invention, which is configured as described above, the processing when the cashing key 75, the cashing & transfer key 76 and the cashing & reception key 77 are selected will be described in accordance with the flowchart (step E10-E310) shown in FIG. 4-FIG. 6 are diagrams respectively showing transition of state of the transaction messages among the ATM 10, the banking host machine 51 and the cashing host machine 61 in the banking system 1 as one embodiment of the present invention. FIG. 7 and FIG. 8 are diagrams respectively showing examples of the screen (accommodation amount confirmation screen) displayed on the customer-operated touch panel display 19 of the ATM 10 constituting the banking system 1 as one embodiment of the present invention.

In the transaction selection screen 19a shown in FIG. 2, when the user selects and depresses the cashing & reception key 77, the ATM 10 carries out the cashing and money reception processing (step E10; transaction instruction input step). In accordance with the instructions displayed on the customer-operated touch panel display 19, the user inserts the credit card issued by the cashing service dealer 60 into the card unit 24 (step E20), and using the customer-operated touch panel display 19, inputs a personal identification number, a desired cashing amount (for example, 100,000 yen) and a reception amount to the user's account (for example, 60,000 yen) (step E30, E40; borrowing application step).

Here, it is preferred to check whether or not the input reception amount is within the desired cashing amount, and when the reception amount is larger than the desired cashing amount, an error message and the like is indicated to the user, and the user is requested to carry out the inputting of a desired cashing amount and a reception amount again.

The input information (credit card number, personal identification number and amount of money) is transmitted to the cashing host machine 61 from the ATM 10 along with the accommodation request message by the borrowing application section 13 (refer to arrowhead A1 in FIG. 4). In the cashing service dealer 60, an examination is carried out by confirming (check) the customer information referring to the cashing customer database 62, and the accommodation information (accommodation database) in the cashing customer database 62 is updated. And then, an accommodation permission message is transmitted to the ATM 10 from the cashing host machine 61 (refer to arrowhead A2 in FIG. 4: borrowing information acquiring step). That is, a credit host communication is carried out between the ATM 10 and the cashing host machine 61 (step E50). The borrowing information-acquiring section 14 receives the accommodation permission message.

In the ATM 10, an accommodation amount confirmation screen 19b (refer to FIG. 7) is displayed on the customer-operated touch panel display 19 (step E60; borrowing money amount presenting step). The user can confirm the accommodated amount of money (cashing amount; in the example shown in FIG. 7, 100,000 yen) as well as the balance of accommodation after receiving the money (balance of cashing after transaction, in the example shown in FIG. 7: 40,000 yen) by confirming the accommodation amount confirmation screen 19b.

When the user confirms the accommodation amount confirmation screen 19*b* displayed in the customer-operated touch panel display 19 of the ATM 10, selects and depresses the confirmation key 79, the receipt printer 25 prints the receipt, and the journal printer 26 prints the journal. And then, the receipt is discharged, and the card unit 24 discharges the credit card (step E70).

In the customer-operated touch panel display 19, a screen, which gives the user instructions to insert the cash card and bankbook issued by the financial institution 50 into the card unit 24 and the bankbook unit 23, is displayed. The user inserts the cash card and the bankbook into the card unit 24 and the bankbook unit 23 in accordance with the instructions (step E80). Card data read out from the cash card and a money reception request message, in which the amount of receiving money input in step E40 are set up, are transmitted to the banking host machine 51 from the ATM 10 (refer to arrowhead A3 in FIG. 4; financial transaction instruction step).

In the financial institution 50, a ledger search is carried out on the financial customer database 52 based on the transmitted card data and amount of the receiving money is added to the outstanding balance in the customer's ledger. And a money reception permission message is transmitted to the ATM 10 from the banking host machine 51 (refer to arrowhead A4 in FIG. 4). That is, a bank host communication is carried out between the ATM 10 and the banking host machine 51 (step E90).

In the banking host machine 51, money reception processing is carried out (step E100); and in the ATM 10, the bankbook unit 23 carries out bankbook printing, the receipt printer 25 carries out receipt printing and the journal printer 26 carries out journal printing. And the balance of accommodation after receiving the money (balance of cashing after transaction; in the example shown in FIG. 7, 40,000 yen) is invested (discharged) in cash by the paper currency unit 21 and the coin unit 22, and the printed receipt is discharged from the receipt printer 25 (step E110).

Further, the printed bankbook and the cash card are discharged from the bankbook unit 23 and the card unit 24 respectively (step E120), and the processing is terminated.

When the user selects and depresses the cashing key 75 in the transaction selection screen 19*a*, the cashing processing is carried out in the ATM 10 (step E130). In accordance with the instructions displayed on the customer-operated touch panel display 19, the user inserts the credit card issued by the cashing service dealer 60 into the card unit 24 (step E140), and inputs the personal identification number and a desired cashing amount (for example, 100,000 yen) using the customer-operated touch panel display 19 (step E150, E160).

The input information (credit card number, personal identification number, amount of money) is transmitted from the ATM 10 to the cashing host machine 61 along with the accommodation request message by the borrowing application section 13 (refer to arrowhead B1 in FIG. 5). After carrying out an examination by referring to the cashing customer database 62 to confirm (check) the customer information in the cashing customer database 62 and updating the accommodation information (accommodation database) in the cashing service dealer 60, an accommodation permission message is transmitted from the cashing host machine 61 to the ATM 10 (refer to arrowhead B2 in FIG. 5). That is, a credit host communication is carried out between the ATM 10 and the cashing host machine 61 (step E170). The borrowing information-acquiring section 14 receives the accommodation permission message.

In the ATM 10, an accommodation amount confirmation screen 19*c* (refer to FIG. 8) is displayed on the customer-operated touch panel display 19 (step E180). The user can confirm the accommodated amount of money (cashing amount; in the example shown in FIG. 8, 100,000 yen) by checking the accommodation amount confirmation screen 19*c*.

After checking the accommodation amount confirmation screen 19*c* displayed on the customer-operated touch panel display 19 of the ATM 10, when the user selects and depresses the confirmation key 79, the paper currency unit 21 and the coin unit 22 on the ATM 10 count and invest the cash (step E190). Further, the receipt printing by the receipt printer 25 and the journal printing by the journal printer 26 are carried out and the receipt is discharged; and then, the credit card is discharged from the card unit 24 (step E200).

When the user selects and depresses the cashing & transfer key 76 in the transaction selection screen 19*a*, a cashing and transfer processing is carried out in the ATM 10 (step E210; transaction instruction input step). In accordance with the instructions displayed on the customer-operated touch panel display 19, the user inserts the credit card issued by the cashing service dealer 60 into the card unit 24 (step E220); and using the customer-operated touch panel display 19, the user inputs the personal identification number, a desired cashing amount (for example, 100,000 yen) and a transfer amount (for example, 60,000 yen) (step E230, E240; borrowing application step).

Here, it is preferred to confirm whether or not the input transfer amount is smaller than the desired cashing amount, and when the transfer amount is larger than the desired cashing amount, an error message and the like is displayed to the user to cause the user to input a desired cashing amount and a transfer amount again. The input information (credit card number, personal identification number and amount of money) is transmitted from the ATM 10 to the cashing host machine 61 along with the accommodation request message by the borrowing application section 13 (refer to arrowhead C1 in FIG. 6). After the cashing service dealer 60 carries out an examination to confirm (check) the customer information by referring to the cashing customer database 62 and updates the accommodation information (accommodation database) in the cashing customer database 62, an accommodation permission message is transmitted from the cashing host machine 61 to the ATM 10 (refer to arrowhead C2 in FIG. 6; borrowing information acquiring step). That is, a credit host communication is carried out between the ATM 10 and the cashing host machine 61 (step E250). The borrowing information-acquiring section 14 receives the accommodation permission message.

In the ATM 10, the accommodation amount confirmation screen 19*b* shown in FIG. 7 is displayed on the customer-operated touch panel display 19 (step E260, borrowing money amount presenting step). The user can confirm the accommodated amount of money (cashing amount, in the example shown in FIG. 7, 100,000 yen) and the balance of accommodation after the transfer of money (balance of cashing after transaction, in the example shown in FIG. 7, 40,000 yen) by checking the accommodation amount confirmation screen 19*b*.

When the user confirms the accommodation amount confirmation screen 19*b* displayed on the customer-operated touch panel display 19 on the ATM 10, and selects and depresses the confirmation key 79, the receipt printing by the receipt printer 25 and the journal printing by the journal printer 26 are carried out; and the receipt is discharged and the credit card discharged by the card unit 24 (step E270).

The customer-operated touch panel display 19 displays a screen instructing the user to input the transfer information relevant to the transfer transaction and to insert a transfer card previously registered with the transfer information. The user inputs the transfer information in accordance with the instructions; and when the user has the transfer card, the user inserts the transfer card (step E280).

The transfer information input or read out from the transfer card and the transfer request message set up with the transfer amount and the like are transmitted from the ATM 10 to the banking host machine 51 (refer to arrowhead C3 in FIG. 6; financial transaction instruction step). Further, the financial institution 50 carries out the transfer processing based on the transmitted transfer information (transfer request message), and a transfer permission message is transmitted from the banking host machine 51 to the ATM 10 (step E290, E300, refer to arrowhead C4 in FIG. 6).

The ATM 10 invests (discharges) the balance of accommodation after the transfer of money (balance of cashing after transaction; in the example shown in FIG. 7, 40,000 yen) in cash. After the receipt printing by the receipt printer 25 and the journal printing by the journal printer 26 are carried out, the printed receipt and the transfer card are discharged from the receipt printer 25 and the like (step E310), and the processing is terminated.

As described above, according to the banking system 1 as one embodiment of the present invention, when a user of the ATM 10 selects and depresses the cashing & transfer key 76 and the cashing & reception key 77 displayed on the customer-operated touch panel display 19, the cashing transaction by the cashing service dealer 60 and the financial transaction (money reception, transfer of money) by the financial institution 50 can be carried out as a series of the processing. Accordingly, user-friendliness is increased and operation time can be reduced.

Also, while carrying out this operation, the cash accommodated by the cashing service dealer 60 is not discharged from the ATM 10, but the financial transaction can be carried out successively using the cash. Since the movement of the cash in the ATM 10 can be reduced, the ratio of mechanical failures in, for example, the paper currency unit 21, the coin unit 22 and the like can be reduced.

Further, during the time from the point when the cashing transaction is carried out and the accommodation is permitted to the point when the financial transaction is carried out, the user does not handle the discharged cash. Accordingly, in the aspect of crime-prevention, the security is increased. For example, even in the ATM 10 installed in a location, where is, compared to the financial institution 50 and the like, low in security level such as convenience stores, the security can be increased.

Further, since the banking system 1 can use hardware resources in the existing banking system as they are, the banking system 1 is cost-effective.

In the above-described embodiment, an example in which, by selecting the cashing & transfer key 76 and the cashing & reception key 77 in the transaction selecting screen 19*a* shown in FIG. 2, the cashing transaction by the cashing service dealer 60 and the financial transaction (money reception, transfer of money) by the financial institution 50 are carried out as a series of processing, has been shown. However, the embodiment is not limited to the above.

Figure 9:
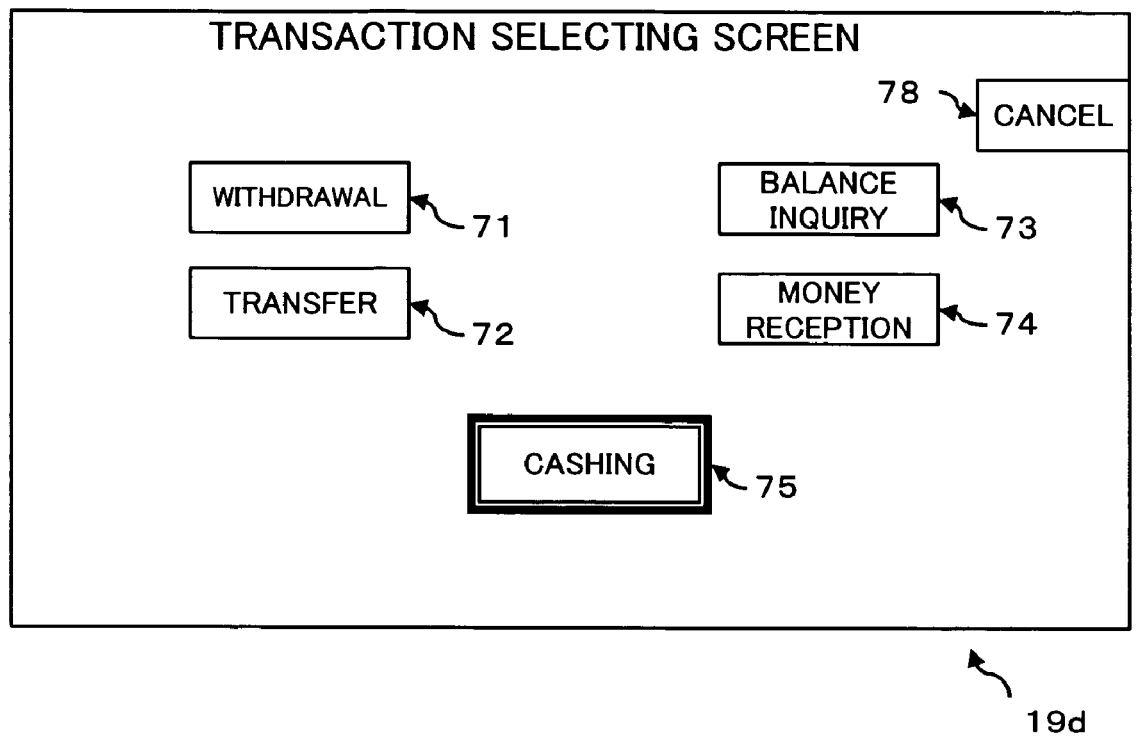
FIG. 9 is a diagram showing a modification of the transaction-selecting screen displayed on the customer-operated touch panel display of the ATM constituting the banking system as one embodiment of the present invention.
Figure 10:
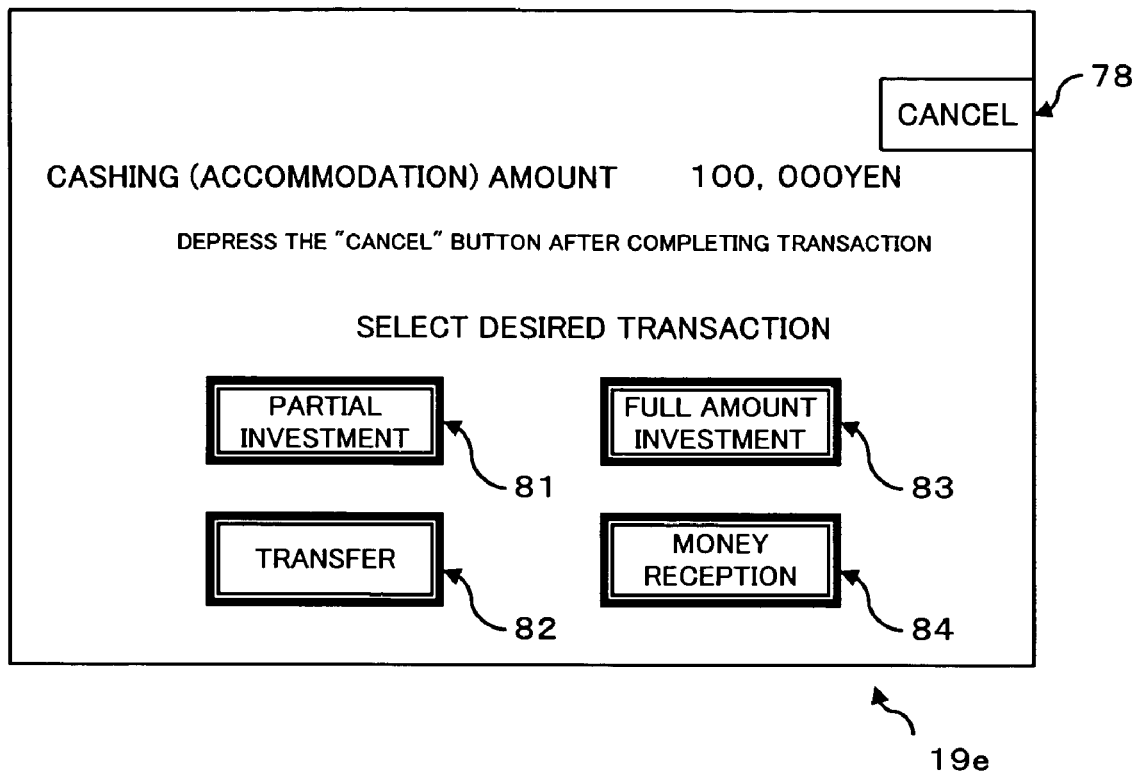
FIG. 10 is a diagram showing a modification of the accommodation amount confirmation screen displayed on the customer-operated touch panel display of the ATM constituting the banking system as one embodiment of the present invention.

FIG. 9 is a diagram showing a modification of a screen (transaction selecting screen) displayed on the customer-operated touch panel display 19 of the ATM 10 constituting the banking system 1 as one embodiment of the present invention. FIG. 10 is a diagram showing a modification of a screen (accommodation amount confirmation screen) displayed on the customer-operated touch panel display 19 of the ATM 10 constituting the banking system 1 as one embodiment of the present invention. In the figures, since the same reference numerals as the above-described numerals denote the same or substantially the same parts, the detailed description thereof will be omitted.

The transaction selecting screen 19*d* shown in FIG. 9 comprises a withdrawal key 71, a transfer key 72, a balance inquiry key 73, a money reception key 74, a cashing key 75 and a cancel key 78. The transaction selecting screen 19*d* is adopted so that, when a user selects an arbitrary key from these keys, each processing such as withdrawal, transfer of money, balance inquiry, reception of money, cashing and canceling can be carried out. The accommodation amount confirmation screen 19*e* shown in FIG. 10 displays cashing (accommodation) amount of money, and is comprised of a partial investment key 81, a transfer key 82, a full amount investment key 83, a money reception key 84 and a cancel key 78.

The partial investment key 81, the transfer key (input key) 82, the full amount investment key 83 and the money reception key (input key) 84 are the keys used for carrying out the processing (transaction) relevant to the financial institution 50 using at least a part of cashing (borrowing money, accommodation) amount of money accommodated by the cashing service dealer 60 as a result of carrying out the cashing processing by selecting and depressing the cashing key 75 on the transaction selecting screen 19*d* shown in FIG. 9. The partial investment key 81 is a key used for investing only a part of the cashing amount. The transfer key 82 is a key used for transferring at least a part of the cashing amount to a particular account. The money reception key 84 is a key used for transferring at least a part of the cashing amount to a user's account. And the full amount investment key 83 is a key used for investing the full of the cashing amount in cash.

That is, the transfer key 82 and the money reception key 84 in the accommodation amount confirmation screen 19*e* are adapted so as to function as an inputting means capable of inputting an instruction to carry out the transaction (application for borrowing money) relevant to the cashing service dealer 60 and the transaction relevant to the financial institution 50 as a series of processing.

In this modification, the above-described transaction selecting screen 19*d* and the accommodation amount confirmation screen 19*e* are adapted so as to be displayed on the customer-operated touch panel display 19 in accordance with the control by the screen display control section 15.

That is, the accommodation amount confirmation screen 19*e* is provided with an input key, which functions as an inputting means capable of inputting an instruction to carry out borrowing money of an amount permitted by the cashing service dealer 60 as well as the transaction relevant to the financial institution 50 using at least a part of the borrowing money as the borrowing information. Thus, the accommodation amount confirmation screen 19*e* is adapted so as to work as the display screen, which functions as the borrowing money presentation section and the transaction instruction inputting section. And the screen display control section 15 is adapted to cause the customer-operated touch panel display 19 to display such display screen.

Figure 11:
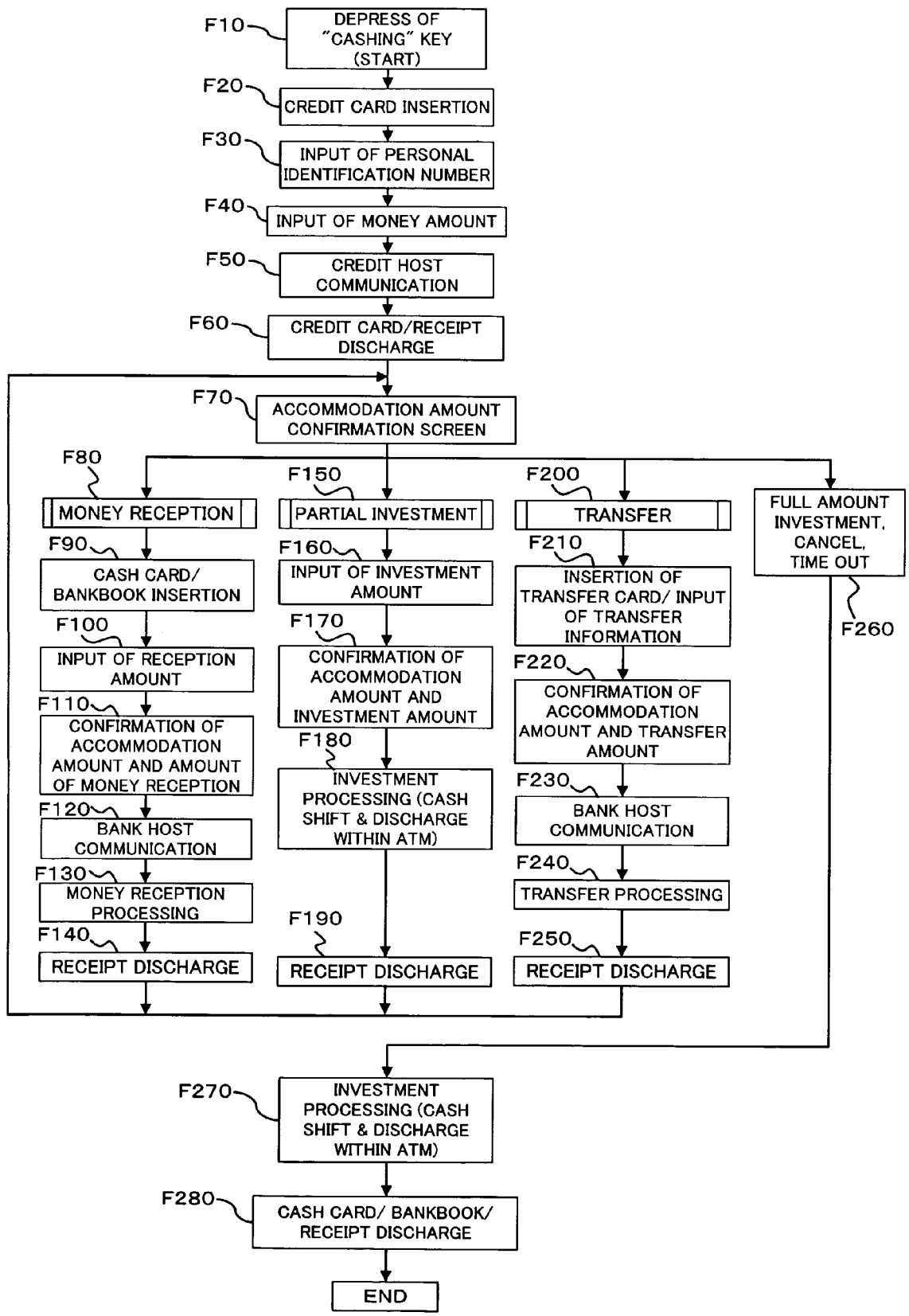
FIG. 11 is a flowchart for illustrating the processing when a cashing key is selected in the transaction-selecting screen displayed on the customer-operated touch panel display of the banking system as one embodiment of the present invention.
Figure 12:
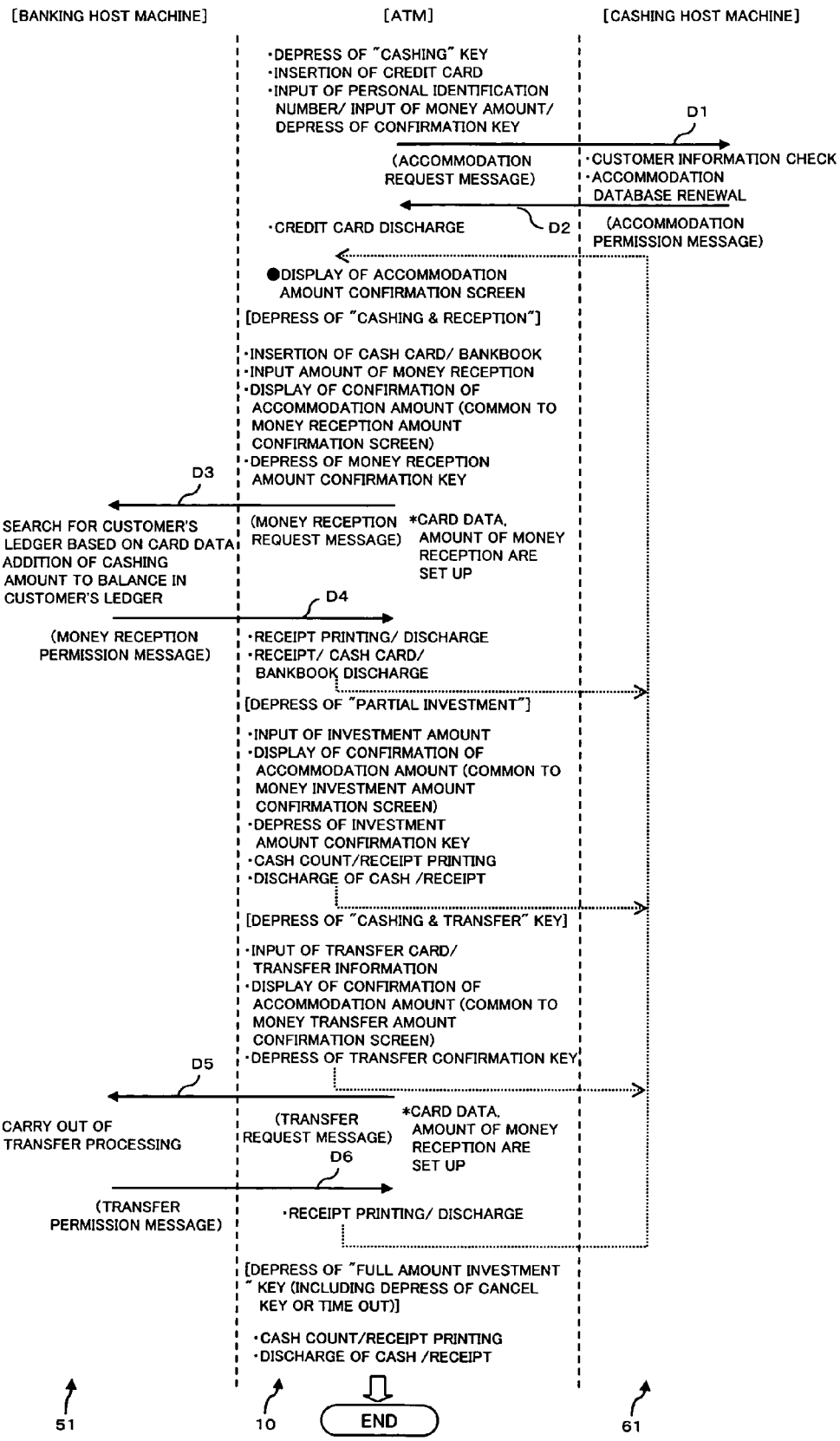
FIG. 12 is a diagram showing transition of state of the transaction message among the ATM, the banking host machine and the cashing host machine in a modification of the banking system as one embodiment of the present invention.
Figure 13:
FIG. 13 is a diagram showing an example of a money amount confirmation screen displayed on the customer-operated touch panel display of the ATM in the modification of the banking system as one embodiment of the present invention; and is a block diagram showing the principle of the present invention.

In the modification of the banking system 1 as one embodiment of the present invention, which is configured as described above, the processing when the cashing key 75 is selected in the transaction selecting screen 19*d* displayed on the customer-operated touch panel display 19 of the ATM 10 will be described in accordance with the flowchart (step F10-F280) shown in FIG. 11 with reference to FIG. 12 and FIG. 13. FIG. 12 is a diagram showing the transition of the state of transaction messages among the ATM 10, the banking host machine 51 and the cashing host machine 61 in the modification of the banking system 1 as one embodiment of the present invention. FIG. 13 is a diagram showing an example of the screen (accommodation amount confirmation screen) 19*f* displayed on the customer-operated touch panel display 19 of the ATM 10 in the modification of the banking system 1 as one embodiment of the present invention.

In the transaction selection screen 19*d* shown in FIG. 9, when the user selects and depresses the cashing key 75 (step F10), the cashing processing is carried out in the ATM 10. The user inserts the credit card issued by the cashing service dealer 60 into the card unit 24 (step F20) in accordance with the instructions displayed on the customer-operated touch panel display 19, and inputs the personal identification number and the desired cashing amount (for example, 100,000 yen) using the customer-operated touch panel display 19 (step F30, F40).

The input information (credit card number, personal identification number and amount of money) is transmitted from the ATM 10 to the cashing host machine 61 along with the accommodation request message by the borrowing application section 13 (refer to arrowhead D1 in FIG. 12). After an examination is carried out by confirming (check) the customer information referring to the cashing customer database 62 and the accommodation information (accommodation database) in the cashing customer database 62 is updated in the cashing service dealer 60, the accommodation permission message is transmitted from the cashing host machine 61 to the ATM 10 (refer to arrowhead D2 in FIG. 12). That is, the credit host communication is carried out between the ATM 10 and the cashing host machine 61 (step F50). The borrowing information-acquiring section 14 receives the accommodation permission message.

In the ATM 10, the receipt printing by the receipt printer 25 and the journal printing by the journal printer 26 are carried out and the receipt is discharged, and the credit card is discharged from the card unit 24 (step F60).

Further, in the ATM 10, the accommodation amount confirmation screen 19*e* (refer to FIG. 10) is displayed on the customer-operated touch panel display 19 (step F70). The user can confirm the amount of the borrowing money (cashing amount; in the example shown in FIG. 10, 100,000 yen) by checking the accommodation amount confirmation screen 19*e*.

When the user selects and depresses the money reception key 84 in the accommodation amount confirmation screen 19*e* displayed on the customer-operated touch panel display 19 of the ATM 10 (step F80), the money reception processing is executed in the ATM 10. On the customer-operated touch panel display 19, a screen instructing the user to insert the cash card and the bankbook issued by the financial institution 50 into the card unit 24 and the bankbook unit 23 is displayed.

In accordance with the instructions, the user inserts the cash card and the bankbook into the card unit 24 and the bankbook unit 23 (step F90), and inputs an amount of the receiving money from the customer-operated touch panel display 19 (step F100). Then, on the customer-operated touch panel display 19, the accommodation amount confirmation screen 19*f* as shown in FIG. 13 is displayed.

The accommodation amount confirmation screen 19*f* shown in FIG. 13 is adapted so as to display, along with the amount of borrowing money (cashing (accommodation) amount of money; in the example shown in FIG. 13, 100,000 yen), the amount of money used for the transaction relevant to the financial institution 50 in the amount of borrowing money (transaction xx amount of money; in the example shown in FIG. 13, 50,000 yen), and the amount of balance after subtracting the amount of money used for the transaction relevant to the financial institution 50 from the amount of borrowing money (amount of cashing (accommodation) after transaction; in the example shown in FIG. 13, 50,000 yen).

Here, it is preferred to confirm whether or not the input amount of the receiving money is smaller than the cashing amount, and when the amount of the receiving money is larger than the cashing amount, an error message and the like is displayed to the user to cause the user to input the amount of the receiving money again.

The accommodation amount confirmation screen 19*f* shown in FIG. 13 can be used for displaying the result of the various transactions relevant to the financial institution 50, which are selected in the accommodation amount confirmation screen 19*e* in the banking system 1. The accommodation amount confirmation screen 19*f* can be used further widely by causing the portion marked with "xx" in FIG. 13 to display the name of the transaction (for example, "money reception", "transfer of money").

The user confirms the amount of borrowing money and the amount of the receiving money on the accommodation amount confirmation screen 19*f*, and selects and depresses the confirmation key 79 formed on the accommodation amount confirmation screen 19*f* (step F110).

Owing to this, the card data read out from the cash card and a money reception request message, in which the amount of the receiving money input in step F100, are transmitted from the ATM 10 to the banking host machine 51 (refer to arrowhead D3 in FIG. 12).

In the financial institution 50, the ledger search is carried out on the financial customer database 52 based on the transmitted card data, the amount of the receiving money is added to the outstanding balance in the customer's ledger, and a money reception permission message is transmitted from the banking host machine 51 to the ATM 10 (refer to arrowhead D4 in FIG. 12). That is, a bank host communication is carried out between the ATM 10 and the banking host machine 51 (step F120).

In the banking host machine 51, the money reception processing is carried out (step F130). In the ATM 10, the bankbook printing by the bankbook unit 23, the receipt printing by the receipt printer 25 and the journal printing by the journal printer 26 are carried out. And then, the printed receipt, cash card and bankbook are discharged from the receipt printer 25, the card unit 24 and the bankbook unit 23 respectively (step F140), and the process returns to step F70.

In the transaction selection screen 19*e*, when the user selects and depresses the partial investment key 81, the partial investment processing is carried out in the ATM 10 (step F150). In accordance with the instructions displayed on the customer-operated touch panel display 19, the user inputs the investment amount through the customer-operated touch panel 191 (step F160).

Here, it is preferred to confirm whether or not the input amount of the investment amount is smaller than the cashing amount, and when the amount of the investment amount is larger than the cashing amount, an error message and the like is displayed to the user to cause the user to input the investment amount again.

After that, the user confirms the amount of borrowing money and the investment amount in the accommodation amount confirmation screen 19*f* displayed on the customer-operated touch panel display 19, and selects and depresses the confirmation key 79 formed on the accommodation amount confirmation screen 19*f* (step F170).

The ATM 10 confirms that the investment amount input in step F160 is smaller than the amount of the borrowing money, carries out cash shift (cash shift in ATM) in the ATM 10 using the paper currency unit 21 and the coin unit 22, and discharges the cash (step F180). Also, in the ATM 10, the receipt printing by the receipt printer 25 and the journal printing by the journal printer 26 are carried out, and the printed receipt and the cash card are discharged from the receipt printer 25 and the card unit 24 respectively (step F190), and the process returns to step F70.

In the transaction selection screen 19e, when the user selects and depresses the transfer key 82 in the ATM 10, the transfer processing is carried out (step F200). In the ATM 10, a screen instructing to input transfer information and transfer amount relevant to the transfer transaction and to insert a transfer card in which the transfer information is previously registered is displayed on the customer-operated touch panel display 19. In accordance with the instruction, the user inputs the transfer information; or when the user has the transfer card, the user inserts the transfer card (step F210).

Here, it is preferred to confirm whether or not the input amount of the transfer amount is smaller than the cashing amount, and when the amount of the transfer amount is larger than the cashing amount, an error message or the like is displayed to the user to cause the user to input the amount of the transfer amount again.

The user confirms the amount of borrowing money and the amount of the transfer amount on the accommodation amount confirmation screen 19f displayed on the customer-operated touch panel display 19, and selects and depresses the confirmation key 79 formed on the accommodation amount confirmation screen 19f (step F220).

Owing to this, the transfer information input in step F210 or read out from the transfer card and the transfer request message, in which the transfer amount and the like are set up, are transmitted from the ATM 10 to the banking host machine 51 (refer to arrowhead D5 in FIG. 12).

In the financial institution 50, based on the transmitted transfer information, the transfer processing is carried out, and a transfer permission message is transmitted from the banking host machine 51 to the ATM 10 (step F230, F240, refer to arrowhead D6 in FIG. 12).

In the ATM 10, after the receipt printing by the receipt printer 25 and the journal printing by the journal printer 26 are carried out, printed receipt and transfer card are discharged from the receipt printer 25 and the like (step F250), and the process returns to step F70.

In the transaction selection screen 19e, when the user does not select the full amount investment key 83 or the cancel key 78, or any instruction is not made for a period longer than a predetermined time (time out), the ATM 10 carries out the investment processing to invest the full amount of the borrowing money (step F260). The ATM 10 carries out cash shift (cash shift in ATM) in the ATM 10 using the paper currency unit 21 and the coin unit 22, and discharges the cash (step F270). In the ATM 10, the receipt printing by the receipt printer 25 and the journal printing by the journal printer 26 are carried out. And if requested, after the printing on the bankbook is carried out by the bankbook unit 23, the printed receipt, the cash card and the bankbook are discharged from the receipt printer 25, the card unit 24 and the bankbook unit 23 respectively (step F280); and the processing is terminated.

As described above, by the modification of the banking system as one embodiment of the present invention also, the same working as that of the previously described embodiment can be obtained. Even after the cashing is carried out, the processing relevant to the financial institution 50 can be successively carried out without discharging the cash from the ATM 10 using the borrowed money. Accordingly, the user-friendliness is increased.

It is adapted so that the CPU (Central Processing Unit) in the information processing system executes a financial transaction program to cause the above-described borrowing application section 13, the borrowing information acquiring section 14, the screen display control section 15, the financial transaction instruction section 16, the input/output control section 17 and the unit control section 18 to function.

The program (financial transaction program) for causing the borrowing application section 13, the borrowing information acquiring section 14, the screen display control section 15, the financial transaction instruction section 16, the input/output control section 17 and the unit control section 18 to function is provided in a state, for example, recorded in a recording medium readable by computer such as a flexible disk, CD (CD-ROM, CD-R, CD-R/W, etc.), DVD (DVD-ROM, DVD-RAM, DVD-R, DVD-RW, DVD+RW, etc.), a magnetic disk, an optical disk, a magnetic optical disk. The computer reads out the program from the recording medium and transfers and stores the program in an internal or external storage to use the same. Or, the program may be recorded in, for example, a storage (recording medium) such as a magnetic disk, an optical disk, a magnetic optical disk, and provided to the computer from the storage via a communication line.

When causing the borrowing application section 13, the borrowing information acquiring section 14, the screen display control section 15, the financial transaction instruction section 16, the input/output control section 17 and the unit control section 18 to function, the program stored in the internal storage (unshown RAM or ROM) is executed by a micro processor in the computer (in this embodiment, a CPU (not shown) provided to the ATM 10). In this case, it may be arranged so that the computer reads out the program recorded in the recording medium and execute the same.

In this embodiment, the wording computer is a concept including hardware and an operating system, and means hardware, which operates under the control of the operating system. Or in the case where an application program only causes the hardware to operate without operating system, the hardware itself is the computer. The hardware includes at least a microprocessor such as CPU and a device for reading out a computer program recorded in the recording medium. In this embodiment, the ATM 10 has the function as the computer.

Further, as for the recording medium in this embodiment, in addition to the above-described flexible disk, CD (CD-ROM, CD-R, CD-R/W, etc.), DVD (DVD-ROM, DVD-RAM, DVD-R, DVD-RW, DVD+RW, etc.), magnetic disk, optical disk, magnetic optical disk, various mediums readable by computer such as an IC card, a ROM cartridge, a magnetic tape, a punch card, the internal storage in the computer (memory such as RAM and ROM), an external storage and a printed material printed with symbols such as bar code and the like may be employed.

The present invention is not limited to the above-described embodiments. The present invention can be carried out being variously modified within a range of the sprit of the present invention.

For example, in the above-described embodiments, in order to present various kinds of information to the users and officer of the ATM 10, the customer-side display LCD 192 and the officer-sided is play LCD 272 are used. However, the present invention is not limited to the above. Another display device such as CRT (Cathode Ray Tube) display may be employed. Also, as for the customer-operated touch panel 191 and the officer-operated touch panel 271, various types of touch panels such as, for example, a touch panel of pressure-sensitive type or electrostatic type are applicable.

In the above embodiments, as the financial institution 50, a bank is exemplified. And as the cashing service dealer 60, a credit company is exemplified. The present invention is not limited to the above. As the financial institution 50, the present invention is applicable to another financial institution such as a cooperative bank. Further, as the cashing service dealer 60, the present invention is applicable to another financial institution (for example, consumer credit companies or banks and the like), which can provide services to accommodate to the customers.

When the embodiments of the present invention are disclosed, the banking system, automatic teller machine, financial transaction method, financial transaction program and recording medium recording the program readable by computer of the present invention can be carried out and manufactured by a person skilled in the art.

The invention claimed is:

1. A banking system, comprising:
 a banking host machine managed by a financial institution,
 a cashing host machine managed by a cashing service dealer, and
 an automatic teller machine connected to the banking host machine and the cashing host machine so as to communicate therewith respectively, wherein
 the banking system includes:
 a borrowing application section that makes an application to the cashing host machine for borrowing money from the cashing service dealer,
 a borrowing information acquiring section that acquires information about the borrowed money permitted by the cashing service dealer in response to the application for borrowing money as borrowing information,
 a transaction instruction inputting section that inputs an instruction to carry out a transaction relevant to the financial institution using at least a part of the borrowed money,
 a financial transaction instruction section that, when the borrowing information acquiring section acquires the borrowing information, gives an instruction to the banking host machine about the transaction relevant to said financial institution using at least a part of said borrowed money in accordance with the instruction inputted by the transaction instruction inputting section, and
 a borrowing money presentation section that presents to the user an amount of borrowed money permitted by said cashing service dealer as the borrowing information,
 wherein when no instruction is given from the transaction instruction inputting section within a predetermined time from a point of time when the borrowing money presentation section presents to the user the available amount of money, the available amount of cash is discharged.

2. The banking system according to claim 1, wherein the transaction instruction inputting section carries out the application to said cashing service dealer for borrowing money and the transaction relevant to said financial institution by one-instruction inputting.

3. The banking system according to claim 1, wherein the transaction instruction inputting section carries out the application to said cashing service dealer for borrowing money and the transaction relevant to said financial institution by one-instruction inputting.

4. The banking system according to claim 1, wherein the borrowing money presentation section presents to the user of the automatic teller machine at least a part of the amount of the borrowed money permitted by said cashing service dealer as an available amount available for the transaction relevant to said financial institution.

5. An automatic teller machine connected to a banking host machine managed by a financial institution and a cashing host machine managed by a cashing service dealer so as to communicate therewith respectively, wherein
 the automatic teller machine comprises:
 a borrowing application section that makes an application to the cashing host machine for borrowing money from the cashing service dealer,
 a borrowing information acquiring section that acquires information about the borrowed money permitted by the cashing service dealer in response to the application for borrowing money as borrowing information,
 a transaction instruction inputting section that inputs an instruction to carry out a transaction relevant to the financial institution using at least a part of the borrowed money,
 a financial transaction instruction section that, when the borrowing information acquiring section acquires the borrowing information, gives an instruction to the banking host machine about the transaction relevant to said financial institution using at least a part of said borrowed money in accordance with the instruction inputted by the transaction instruction inputting section, and
 a borrowing money presentation section that presents to the user an amount of borrowed money permitted by said cashing service dealer as the borrowing information,
 wherein when no instruction is given from the transaction instruction inputting section within a predetermined time from a point of time when the borrowing money presentation section presents to the user the available amount of money, the available amount of cash is discharged.

6. The automatic teller machine according to claim 5, wherein the transaction instruction inputting section is an inputting means capable of inputting an instruction to carry out the application to said cashing service dealer for borrowing money and the transaction relevant to said financial institution as a serial processing.

7. The automatic teller machine according to claim 5, wherein the borrowing money presentation section presents to the user of the automatic teller machine at least a part of the amount of the borrowed money permitted by said cashing service dealer as an available amount available for the transaction relevant to said financial institution.

8. A financial transaction method, comprising:
 a borrowing application step in which a borrowing application section makes an application to a cashing host machine managed by a cashing service dealer for borrowing money from the cashing service dealer,
 a borrowing information acquiring step in which a borrowing information acquiring section acquires information about the borrowed money permitted by the cashing service dealer in response to the application for borrowing money as borrowing information,
 a transaction instruction inputting step in which a transaction instruction section inputs an instruction to carry out a transaction relevant to a financial institution using at least a part of the borrowed money,
 a financial transaction instruction step in which, when the borrowing information acquiring section acquires the borrowing information, an instruction is given to a banking host machine managed by the financial institution about the transaction relevant to said financial institution using at least a part of said borrowed money, in accordance with the instruction inputted by the transaction instruction inputting section, and a borrowing money presentation step in which a borrowing money presentation section presents to the user an amount of borrowed money permitted by said cashing service dealer as the borrowing information, wherein when no instruction is given from the transaction instruction inputting section within a predetermined time from a point of time when the borrowing money presentation section presents to the user the available amount of money, the available amount of cash is discharged.

9. The financial transaction method according to claim 8, wherein in the transaction instruction inputting step, the application to said cashing service dealer for borrowing money and the transaction relevant to said financial institution are carried out by one-instruction inputting.

10. The financial transaction method according to claim 8, wherein in the transaction instruction inputting step, the application to said cashing service dealer for borrowing money and the transaction relevant to said financial institution are carried out by one-instruction inputting.

11. The financial transaction method according to claim 8, in the borrowing money amount presenting step, at least a part of the amount of the borrowed money permitted by said cashing service dealer is presented to the user of the automatic teller machine as the available amount available for the transaction relevant to said financial institution.

12. A recording medium recording a financial transaction program readable by a computer, wherein the financial transaction program causes the computer to function as a borrowing application section that makes an application to a cashing host machine managed by a cashing service dealer for borrowing money from the cashing service dealer, a borrowing information acquiring section that acquires information about the borrowed money permitted by the cashing service dealer in response to the application for borrowing money as borrowing information, a transaction instruction inputting section that inputs an instruction to carry out a transaction relevant to a financial institution using at least a part of the borrowed money, a financial transaction instruction section that, when the borrowing information acquiring section acquires the borrowing information, gives an instruction to a banking host machine managed by the financial institution about the transaction relevant to said financial institution using at least a part of said borrowed money in accordance with the instruction inputted by the transaction instruction inputting section, and a borrowing money presentation section that presents to the user an amount of borrowed money permitted by said cashing service dealer as the borrowing information, wherein when no instruction is given from the transaction instruction inputting section within a predetermined time from a point of time when the borrowing money presentation section presents to the user the available amount of money, the available amount of cash is discharged.

\* \* \* \* \*